3,402,976
STEREOSCOPIC DOUBLE-MICROSCOPE
Hans Littmann, Heidenheim (Brenz), Germany, assignor to Carl-Zeiss-Stiftung, Wurttemberg, Germany
Filed July 1, 1965, Ser. No. 468,846
Claims priority, application Germany, July 24, 1964, Z 10,987
1 Claim. (Cl. 350—33)

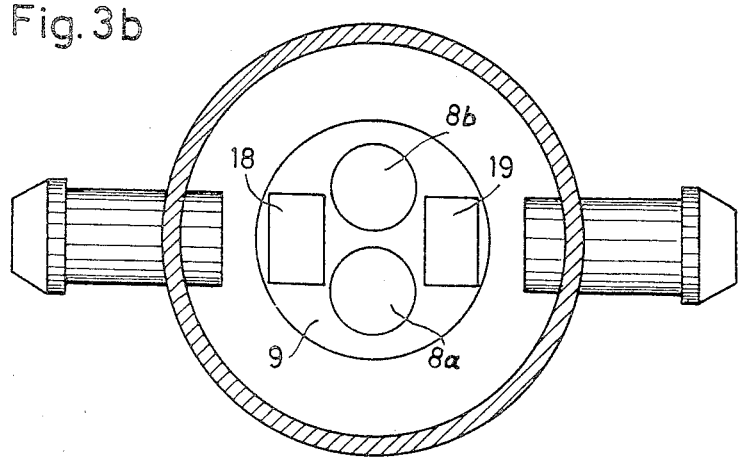
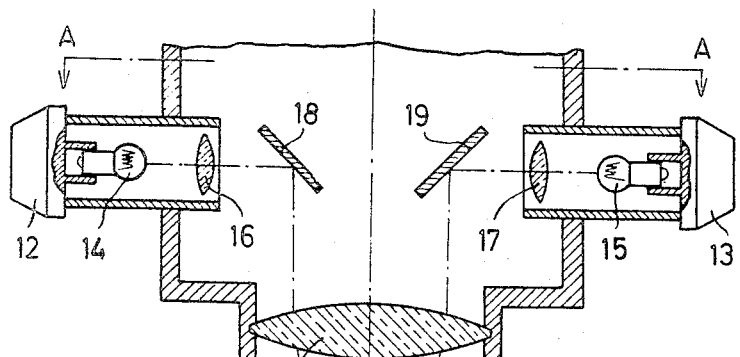

ABSTRACT OF THE DISCLOSURE

A double stereomicroscope is provided with a light beam splitting device which enables two observers to simultaneously view identical images of the object being viewed. The beam splitting device, consisting of two prisms cemented together, is located centrally between two angularly mounted binocular tubes with associated eyepieces and above a double magnification changer and a main objective.

---

The present invention relates to a stereoscopic double-microscope, which is constructed in such a manner, that the paths of rays for both observers follow an identical course between the object to be viewed and the main objective of a microscope. Accordingly both observers have in effect exactly the same direction of vision, this being of importance in the viewing of deep-seated objects and in surgical operations through small openings. With the known devices this possibilty frequently does not exist, because the paths of the rays for both observers do not follow identical courses between the object and the main objective of the double microscope but one path is at least slightly inclined with respect to the other.

The invention makes use of the fact that a parallel path of rays exists in this type of stereoscopic operation-microscopes between the main objective and the binocular tube. In accordance with the invention a special beam-splitting element is disposed in this parallel path of rays, and in fact it is placed between the double magnification changer and the eyepiece tubes. With this beam splitter the two paths of beams of the two stereo microscopes are brought into exact coincidence from the respective magnification-changer to the object to be viewed.

The special beam splitting element according to the invention consists of a first asymmetrical pentagonal prism, whose base surface carries a partially reflective mirror coating and a second trapezoidal prism provided with reflective surfaces. Both these prisms are cemented together to form a unitary glass body whose cementing surface is provided with a partially reflective coating.

For the purpose of illuminating the field of operation the microscope is equipped in a well known manner with one or several rotatably and pivotally arranged lamps with adjustable illumination objectives, or two such lamps which are built into the mount of the main objective whereby the light rays are deflected by two reflectors in the path of the observation rays.

The features of the invention will now be described again with reference to the accompanying drawings, in which:

FIG. 3a illustrates diagrammatically a longitudinal section taken at a position rotated 90° with respect to the showing of FIG. 1, this section extending through the mount of the main objective and the built-in parts of the illumination device, and FIG. 3b. is a cross-section along the line A—A in FIG. 3a.

Figure 1:
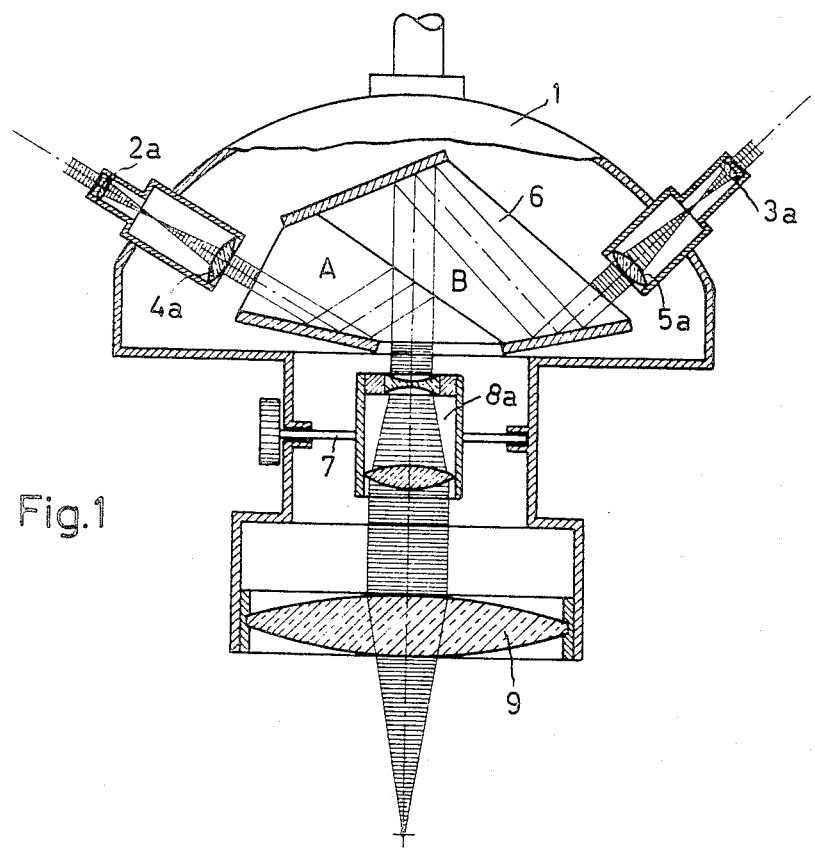
FIG. 1 shows diagrammatically a longitudinal section of a double-stereomicroscope in accordance with the invention.

The housing 1 illustrated in FIGURE 1 may be attached by a holder with a support such as a tripod and contains the two oppositely arranged binocular tubes of the stereomicroscopes employed for simultaneous observation of an object. Only the eyepieces 2a and 3a facing the observer of the drawing as well as the respective associated tube for the objectives 4a and 5a are shown in the drawing. Inside of the housing 1 and between the inner ends of the binocular tubes is disposed a beam-splitter 6, which consists of the two prisms A and B which are cemented to one another. The prism A is a pentagonal prism which may be conceived to have resulted from a somewhat rectangular prism, whose surface including the small angle is cut at an acute angle with respect to the adjoining hypotenuse surface, and whose surface including the right angle is cut to attain a plane continuation with the other prism B which is a partial prism. The remaining shortside surface forms a cementing surface, which is provided with a partially reflective coating and engages the trapezoidal partial prism B. The two surfaces of the prism B as well as the outer rim of the base surface of the prism A are provided with reflective coatings.

Below the beam splitter 6 is arranged a double Galileic magnification-chamber 7, which in a well known manner may consist of two different Galilean-systems 8a and 8b rotatable about the horizontal axis 8 and which upon a rotative adjustment of 180°, depending upon the position of the diffusing and collective member, provide a stronger or weaker magnification. On the other side of the magnification changer is disposed the main objective 9 common to both paths of rays.

As apparent, the light rays issuing from the central object point P travel to the semi-reflective cementing layer of the beam-splitting element 6 in a common or solid bundle, and only then the bundle is split by a reflection on the cementing layer, or on the upper surface of the prisms, respectively, and after further reflection is conducted into the different objective- and eyepiece tubes. The directions of vision are accordingly identical for both observers in the decisive part of the path of rays.

Figure 2:
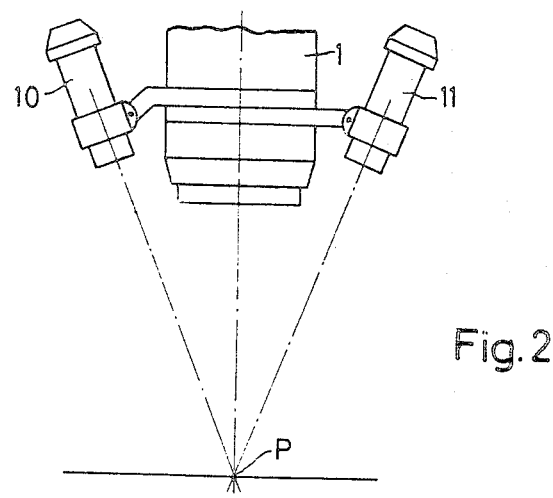
FIG. 2 illustrates the microscope housing provided with two pivoted lamps which are focusable on the same point of the objective to be viewed.

FIG. 2 shows the housing or objective mount of the device containing the main objective and housing two lamps 10 and 11 pivotally mounted thereon. These lamps may be directed focusably to the same point P of the field of operation.

The FIGURES 3a and 3b show in longitudinal and and cross-section views taken perpendicularly to the showing of FIG. 1, the same part of the device, namely the housing or objective mount with the main objective 9. However, the two lamps 12 and 13 with the sources of light 14 and 15 and the illumination objectives 16 and 17 extend horizontally into the housing or mount 1. The focusable paths of rays of these lamps are deflected by reflectors 18 and 19 arranged directly adjacent the observation-path-of-rays, and are conducted through the common main objective 9 to the object to be viewed.

What I claim is:

1. A double stereomicroscope including within a housing a main objective facing the object to be viewed, a double magnification changer above said main objective, two binocular tubes arranged on opposite sides of said housing, and a beam splitter between said two binocular tubes and said double magnification changer, said beam splitter comprising two prisms which are cemented to one another, one of said prisms being an asymmetrical pentagonal prism having one of its surfaces provided with a partially reflective layer and which is cemented with said layer to one surface of said other prism which is a trapezoidal prism, said partially reflective layer being arranged inclined to the axis of the beam of light rays passing through said main objective and said magnification changer, said beam of light rays being divided by said partially reflective layer into two portions, one portion of said beam of light rays being reflected by said partially reflective layer toward an opposite surface of said pentagonal prism provided with a total reflective layer from which said one portion of said beam of light rays is reflected into one of said binocular tubes, said other portion of said beam of light rays passing straight through said partially reflective layer onto a totally reflective layer provided on one of the surfaces of said trapezoidal prism and being reflected therefrom onto another totally reflective layer on the other opposite surface of said trapezoidal prism from which said other portion of said beam of light rays is reflected into the other one of said binocular tubes, and perpendicularly offset plural illumination means with corresponding reflectors for directing the illumination light rays through said main objective toward the object which is to be viewed.

References Cited

UNITED STATES PATENTS

| | | | |
|---|---|---|---|
| 983,569 | 2/1911 | Rohr | 350—35 X |
| 1,873,149 | 8/1932 | Perez | 350—91 |
| 2,634,654 | 4/1953 | Bauersfeld | 350—35 X |
| 2,857,523 | 10/1958 | Corso. | |
| 2,901,943 | 9/1959 | Tackaberry | 350—36 |
| 3,062,099 | 11/1962 | French | 350—91 X |
| 3,173,984 | 3/1965 | Vogl | 350—35 X |
| 3,186,300 | 6/1965 | Littmann | 351—6 X |

FOREIGN PATENTS 396,325   8/1933   Great Britain.

OTHER REFERENCES

Jewell: "An Illuminator for Use in Metallographic Microscopy," vol. 14, J.O.S.A., pp. 159–67 (January–June 1927).

DAVID SCHONBERG, *Primary Examiner.*

W. L. BROWN, *Assistant Examiner.*